United States Patent
Kanga et al.

(10) Patent No.: US 9,892,325 B2
(45) Date of Patent: Feb. 13, 2018

(54) IMAGE MANAGEMENT SYSTEM

(71) Applicant: iOmniscient Pty Ltd, Gordon, New South Wales (AU)

(72) Inventors: Rustom Adi Kanga, Gordon (AU); Ivy Lai Chun Li, Gordon (AU)

(73) Assignee: iOmniscient Pty Ltd, Gordon (AU)

( * ) Notice: Subject to any disclaimer, the term of this patent is extended or adjusted under 35 U.S.C. 154(b) by 16 days.

(21) Appl. No.: 14/851,736

(22) Filed: Sep. 11, 2015

(65) Prior Publication Data

US 2016/0078302 A1    Mar. 17, 2016

(30) Foreign Application Priority Data

Sep. 11, 2014   (AU) ............................... 2014903637

(51) Int. Cl.
  *G06K 9/00*    (2006.01)
  *G06K 9/46*    (2006.01)
  *G06K 9/62*    (2006.01)

(52) U.S. Cl.
  CPC ..... *G06K 9/00778* (2013.01); *G06K 9/00295* (2013.01); *G06K 9/00677* (2013.01); *G06K 9/4671* (2013.01); *G06K 9/6293* (2013.01)

(58) Field of Classification Search
  CPC ........... G06K 9/00778; G06K 9/00677; G06K 9/4671; G06K 9/6293; G06K 9/00295
  See application file for complete search history.

(56) References Cited

U.S. PATENT DOCUMENTS

| | | | | |
|---|---|---|---|---|
| 5,412,708 A | * | 5/1995 | Katz | G06Q 30/02 348/14.05 |
| 7,957,565 B1 | * | 6/2011 | Sharma | G06K 9/00778 382/103 |
| 8,660,895 B1 | * | 2/2014 | Saurabh | G06Q 30/0204 705/14.42 |
| 8,665,333 B1 | * | 3/2014 | Sharma | G06K 9/00771 348/135 |
| 2003/0002712 A1 | * | 1/2003 | Steenburgh | G06K 9/00778 382/103 |
| 2004/0117638 A1 | * | 6/2004 | Monroe | G06K 9/00221 713/186 |
| 2004/0240711 A1 | * | 12/2004 | Hamza | G06K 9/00201 382/118 |
| 2005/0197923 A1 | * | 9/2005 | Kilner | G06K 9/00221 382/118 |
| 2005/0198661 A1 | * | 9/2005 | Collins | G09F 27/00 725/19 |
| 2008/0114633 A1 | * | 5/2008 | Wolf | G06F 17/30793 705/7.29 |

(Continued)

*Primary Examiner* — Aaron W Carter
(74) *Attorney, Agent, or Firm* — Fitch Even Tabin & Flannery LLP

(57) ABSTRACT

The present invention relates to systems and processes for the management of image data captured by a network covering a plurality of imaging nodes. The systems and processes may include a surveillance network arranged to receive surveillance streams from a plurality of checkpoints that are spatially separated along a route, extracting image data containing facial image content from the surveillance streams, and identifying individual people and determining an elapsed time between distinct checkpoints along the route, to track progress of people along the route.

32 Claims, 5 Drawing Sheets

(56) References Cited

U.S. PATENT DOCUMENTS

| | | | |
|---|---|---|---|
| 2008/0151049 A1* | 6/2008 | McCubbrey | G08B 13/19641 348/143 |
| 2008/0247609 A1* | 10/2008 | Feris | G06K 9/00369 382/118 |
| 2011/0128150 A1* | 6/2011 | Kanga | G08B 13/19669 340/541 |
| 2012/0288165 A1* | 11/2012 | Bedros | G06K 9/036 382/118 |
| 2013/0148898 A1* | 6/2013 | Mitura | G06K 9/62 382/195 |
| 2013/0155229 A1* | 6/2013 | Thornton | H04N 7/18 348/143 |
| 2013/0182114 A1* | 7/2013 | Zhang | H04N 7/18 348/150 |
| 2014/0139660 A1* | 5/2014 | Zhu | G06K 9/00369 348/143 |
| 2015/0206297 A1* | 7/2015 | Kritt | G06K 9/00288 382/195 |
| 2015/0379355 A1* | 12/2015 | Kanga | G08B 13/19671 382/103 |
| 2016/0012297 A1* | 1/2016 | Kanga | G06K 9/00771 382/103 |
| 2016/0014133 A1* | 1/2016 | Kanga | H04L 63/102 726/4 |
| 2016/0078302 A1* | 3/2016 | Kanga | G06K 9/00778 382/118 |
| 2016/0224837 A1* | 8/2016 | Lipert | G06K 9/00771 |
| 2016/0350587 A1* | 12/2016 | Bataller | G06T 7/80 |

* cited by examiner

IMAGE MANAGEMENT SYSTEM

CROSS-REFERENCE TO RELATED APPLICATIONS

This application claims priority from Australian Patent Application No. 2014903637, filed Sep. 11, 2014, which is hereby incorporated by reference in its entirety.

FIELD OF THE INVENTION

The present invention relates to the management of image data captured by a network having a plurality of imaging nodes.

BACKGROUND

Surveillance networks (such as CCTV networks) are widely deployed in sophisticated monitoring systems. Prominent applications for electronic surveillance include asset security, congestion management and operational monitoring. Conventional surveillance networks produce a series of surveillance streams that are usually relayed to a control room for evaluation by an operator (such as a security guard or process facility manager).

Most surveillance systems temporarily preserve surveillance content in storage mediums (such as magnetic hard drives and solid state memory) to facilitate subsequent evaluation by an authorized reviewer (such as a manager or police officer). The surveillance content may be encoded and compressed (typically using an established encoding protocol such as MPEG for video streams) prior to storage to reduce memory overheads. Surveillance content is often periodically overwritten during cyclic reuse of the allotted storage mediums (although some organization may prescribe minimum retention periods for sensitive surveillance content).

SUMMARY OF THE INVENTION

In a first aspect, the present invention provides a surveillance process comprising:

a computing system receiving surveillance streams from a plurality of checkpoints that are spatially separated along a route, each of the surveillance streams comprising a sequence of image frames, the computing system detecting image content that is indicative of people within individual image frames of the surveillance streams and extracting image data from sub-frame sections that contain facial image content for individual people, the computing system storing the extracted image data in system memory with time data that defines a temporal reference for the corresponding image fame, the computing system matching image data derived from surveillance streams captured at distinct checkpoints along the route, and the computing system determining an elapsed time between the distinct checkpoints for individual people from the time data stored with each set of matching image data.

In an embodiment, the computing system isolates the sub-frame sections that contain facial characteristics of detected people and stores the isolated sub-frame sections in system memory with time data.

In an embodiment, the computing system quantifies facial characteristics of people detected in the surveillance streams and compiles facial profiles from quantified facial characteristic data for each of the people.

In an embodiment, the computing system identifies a predefined subset of facial features captured in the sub-frame sections and generates facial profiles comprising quantified facial data derived from the predefined subset of facial features.

In an embodiment, the computing system generates the facial profiles from the relative position, size and/or shape of a detected persons eyes, nose, cheekbones and/or jaw.

In an embodiment, the computing system compares the facial profiles derived from surveillance streams captured at distinct checkpoints to track progress of people along the route.

In an embodiment, the computing system normalizes the sub-frame sections containing facial image content using a repository of facial images and identifies distinctive image characteristics from the sub-frame sections.

In an embodiment, the computing system records the distinctive image characteristics in profiles and compares the profiles derived from surveillance streams captured at distinct checkpoints to track progress of people along the route.

In an embodiment, the computing system detects image content that is indicative of a plurality of people within a single frame of a surveillance stream and extracts image data for each of the detected people from corresponding sub-frame sections of the image frame.

In an embodiment, the computing system identifies facial image content for an individual person captured in a plurality of consecutive image frames from a single surveillance stream and comparatively evaluates the facial image content captured in each of the consecutive frames.

In an embodiment, the computing system compiles a facial profile from image data selectively extracted from one of the consecutive image frames.

In an embodiment, the computing system compiles a consolidated facial profile from image data extracted from a plurality of the consecutive image frames.

In a second aspect, the present invention provides a surveillance process comprising:

receiving images of a person at a plurality of checkpoints that are spatially separated along a route, matching facial image content captured at distinct checkpoints along the route to track progression of the person, and determining an elapsed time for the person between the distinct checkpoints using a temporal reference derived from corresponding images of the person.

In an embodiment, the process comprises detecting image content within sub-frame sections of a surveillance stream and generating profiles from sub-frame sections that contain facial content for individual people.

In an embodiment, the process comprises tagging profiles with time data, derived from a corresponding image frame, that defines a temporal reference.

In an embodiment, the process comprises quantifying facial characteristics of people detected in the surveillance streams and compiling profiles from the quantified facial characteristic data.

In an embodiment, the process comprises identifying a predefined subset of facial features for a detected person and generating a profile comprising quantified facial data derived from the predefined subset of facial features.

In an embodiment, the process comprises normalizing the sub-frame sections containing facial image content using a repository of facial images, identifying distinctive image characteristics from the sub-frame sections, and recording the distinctive image characteristics in profiles.

In an embodiment, the process comprises matching profiles derived from surveillance streams captured at distinct checkpoints to track a person's progress along the route.

In a third aspect, the present invention provides a surveillance system comprising a computing system that is configured to receive surveillance streams from a plurality of imaging nodes disposed at spatially separated checkpoints along a route and track the progress of people along the route using elapsed time between distinct checkpoints, the computing system having an image processing module that is configured to generate facial profiles for individual people captured within frames of the surveillance streams and match facial profiles derived from distinct surveillance streams to determine an elapsed time between checkpoints for corresponding people.

In an embodiment, the system comprises a recording module that is configured to isolate sub-frame sections captured within the surveillance streams that contain facial characteristics of detected people, and store the isolated sub-frame sections in system memory with time data that defines a temporal reference for the corresponding image fame.

In an embodiment, the system comprises a profiling engine that is configured to quantify facial characteristics of people captured within the surveillance streams and compile facial profiles from quantified facial characteristic data for each of the people.

In an embodiment, the system comprises a profiling engine that is configured to identify a predefined subset of facial features captured in the isolated sub-frame sections and generate facial profiles comprising quantified facial data derived from the predefined subset of facial features.

In an embodiment, the profiling engine is configured to generate facial profiles from the relative position, size and/or shape of a detected people eyes, nose, cheekbones and/or jaw.

In an embodiment, the system comprises a matching engine that is configured to compare facial profiles derived from surveillance streams captured at distinct checkpoints to track progress of people along the route.

In an embodiment, the system comprises a profiling engine that is configured to normalize the isolated sub-frame sections using a repository of facial images, and identify distinctive image characteristics from the sub-frame sections.

In an embodiment, the system comprises a matching engine that is configured to record the distinctive image characteristics in profiles, and compare the profiles derived from surveillance streams captured at distinct checkpoints to track progress of people along the route.

In an embodiment, the system comprises a tracking engine that is configured to detect image content indicative of a plurality of people within a single frame of a surveillance stream, and extract image data for each of the detected people from corresponding sub-frame sections of the image frame.

In an embodiment, the system comprises a compliance engine that is configured to identify facial image content for individual people captured in a plurality of consecutive image frames from a single surveillance stream, and comparatively evaluate the facial image content captured in each of the consecutive frames.

In an embodiment, the system comprises a profiling engine that is configured to compile a facial profile from image data selectively extracted from one of the consecutive image frames.

In an embodiment, the system comprises a profiling engine that is configured to compile a consolidated facial profile from image data extracted from a plurality of the consecutive image frames.

In a fourth aspect, the present invention provides a surveillance process comprising:

a computing system receiving images of people at a surveillance location, the computing system matching facial image data captured at the surveillance location, and the computing system determining a dwell time for people at the surveillance location.

In an embodiment, the computing system detects image content within sub-frame sections of a surveillance stream captured at the surveillance location and generates profiles from sub-frame sections that contain facial content for individual people.

In an embodiment, the computing system tags profiles with time data, derived from a corresponding image frame, that defines a temporal reference.

In an embodiment, the computing system quantifies facial characteristics of people detected in the surveillance stream and compiles profiles from quantified facial characteristic data.

In an embodiment, the computing system identifies a predefined subset of facial features captured in the sub-frame sections and generates profiles comprising quantified facial data derived from the predefined subset of facial features.

In an embodiment, the computing system normalizes the sub-frame sections containing facial image content using a repository of facial images, identifies distinctive image characteristics from the sub-frame sections, and records the distinctive image characteristics in profiles.

In an embodiment, the computing system determines dwell times for people at the surveillance location by computing an elapsed time for sets of matching image data using the corresponding time data.

In a fifth aspect, the present invention provides a surveillance process comprising detecting people within surveillance images, matching image data extracted from temporally spaced surveillance images and determining an elapsed time between matching facial image data.

In a sixth aspect, the present invention provides a surveillance system comprising:

a network of imaging nodes disposed along a route at spatially separated checkpoints, each of the imaging nodes having a camera that captures a localized surveillance stream comprising a sequence of image frames and a processing unit that generates profiles from the corresponding surveillance stream, and a computing system that receives profiles from the imaging nodes and tracks the progress of individual people along the route using elapsed time between distinct checkpoints, the computing system having a processor that matches profiles derived from distinct checkpoints and determines the elapsed time from the corresponding surveillance streams.

In a seventh aspect, the present invention provides a surveillance process comprising:

a computing system receiving surveillance streams from a plurality of checkpoints that are spatially separated along a route, each of the surveillance streams comprising a sequence of image frames, the computing system automatically detecting image content in sub-frame sections of the surveillance streams and generating profiles from sub-frame sections that contain facial content for individual people, and the computing system matching profiles derived from surveillance streams captured at distinct checkpoints along the route to track progression of the people.

In an eighth aspect, the present invention provides a surveillance process comprising capturing images of a person at a plurality of checkpoints that are spatially separated along a route, and matching facial image data derived from images captured at distinct checkpoints along the route to track progression of the person.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION

Embodiments of a surveillance process and system are disclosed in this specification. In these embodiments, the system tracks people along defined routes using facial recognition to evaluate progress between distinct checkpoints. The people that the system tracks may be traveling in vehicles or on foot. The system is described primarily using pedestrians as an example. The same methodology applies to people in vehicles (such as cars, buses, trains, mopeds and motorcycles) and using self-propelled transport (such as bicycles, skateboards and roller skates). The system quantifies the progress of people using 'dwell times' (a measure of elapsed time between checkpoints) in the disclosed embodiments.

The disclosed system is capable of detecting suspicious behavior and pedestrian delays in crowded enclosed spaces (such as airports, train stations, shopping malls and school buildings). Increasing dwell times between checkpoints can be indicative of insufficient resource allocation causing delays (such as a backlog of passengers at a customs terminal). Individual pedestrians with excessive dwell times between secure or sensitive checkpoints may be investigated.

The disclosed system collects image streams from a plurality of distinct checkpoints disposed along a monitored route (such as the corridors of an airport arrival area). Each of the image streams is processed using facial recognition software to detect and profile pedestrians. The system matches facial profiles extracted from distinct checkpoints to determine dwell times for individual pedestrians.

Figure 1:
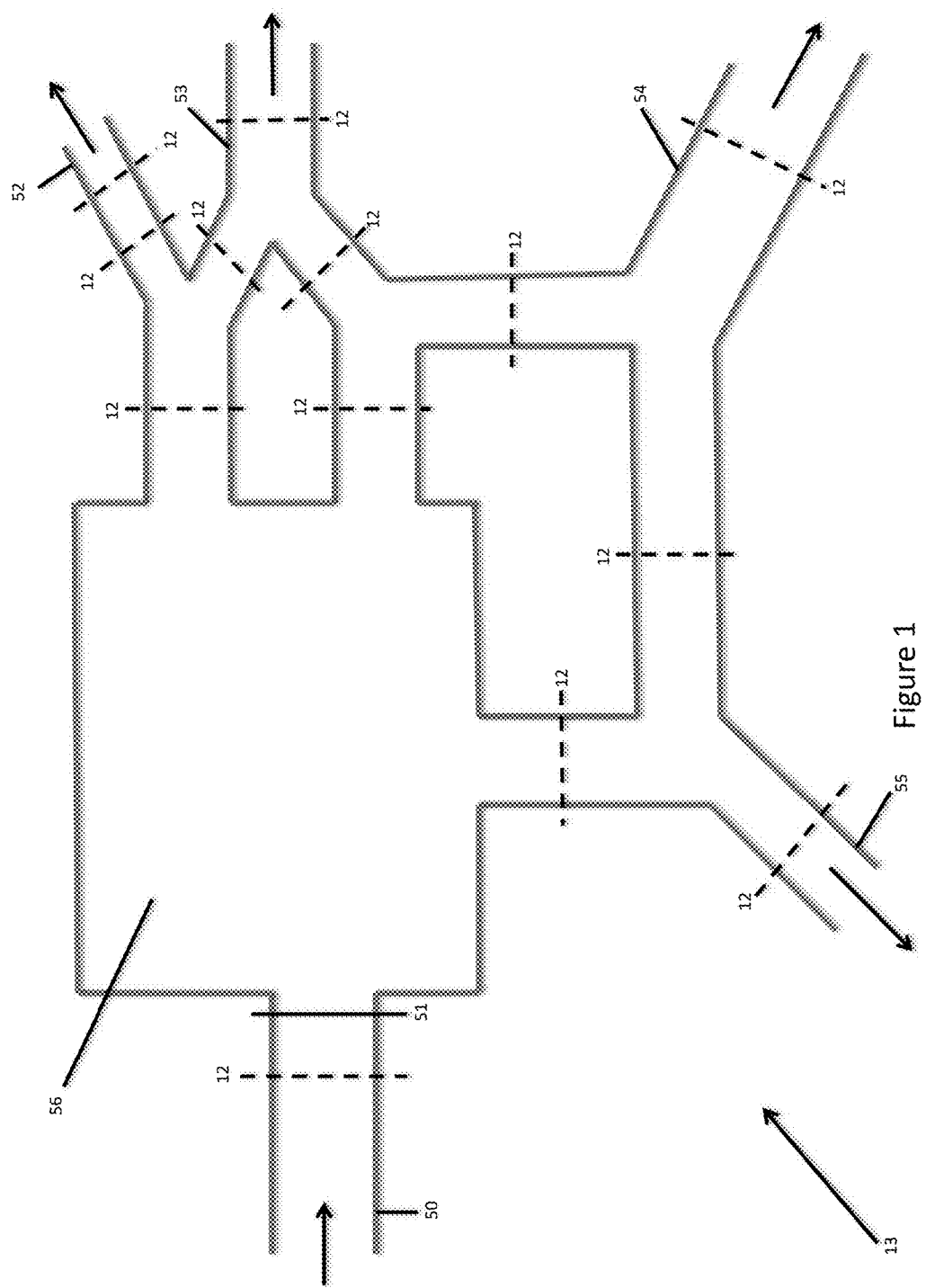
FIG. 1 is a plan view of a surveillance network comprising a plurality of imaging nodes disposed at distinct checkpoints along a route.

An exemplary surveillance network is depicted in FIG. 1. The network comprises a plurality of imaging nodes 12 (such as CCTV cameras) that are disposed along a route 13 (such as the corridors of an airport departure or arrival area, shopping center or school building). The imaging nodes 12 are spatially separated along the route at distinct checkpoints.

The imaging nodes 12 capture a localized sequence of image frames at a corresponding checkpoint. The image frames are compiled into a surveillance stream and transmitted to a centralized surveillance server. The surveillance server receives surveillance streams from each of the imaging nodes 12 and tracks the progress of pedestrians along the route 13.

Figure 2B:
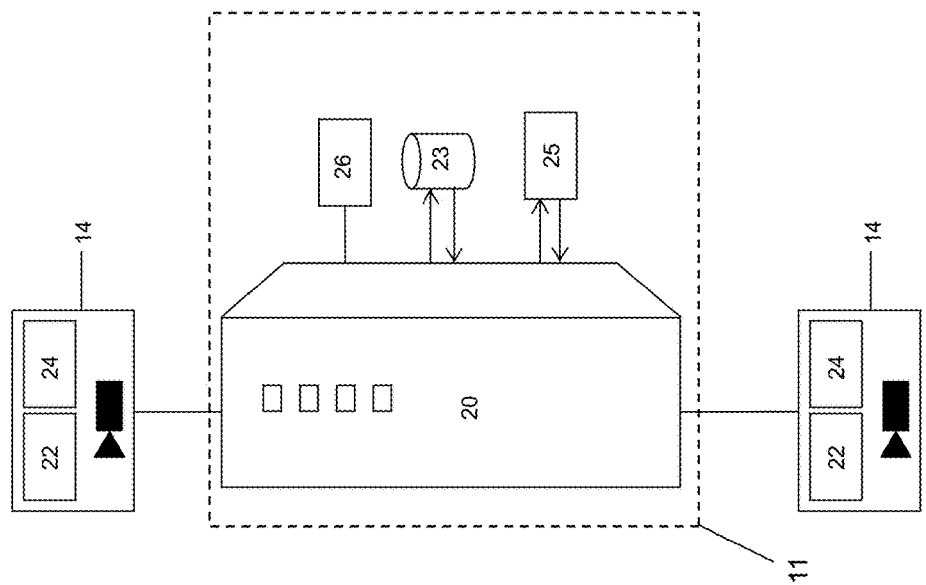
FIG. 2b is a schematic representation of a computer implemented surveillance system comprising a plurality of imaging nodes and a surveillance server that receives image data from the imaging nodes.
Figure 2A:
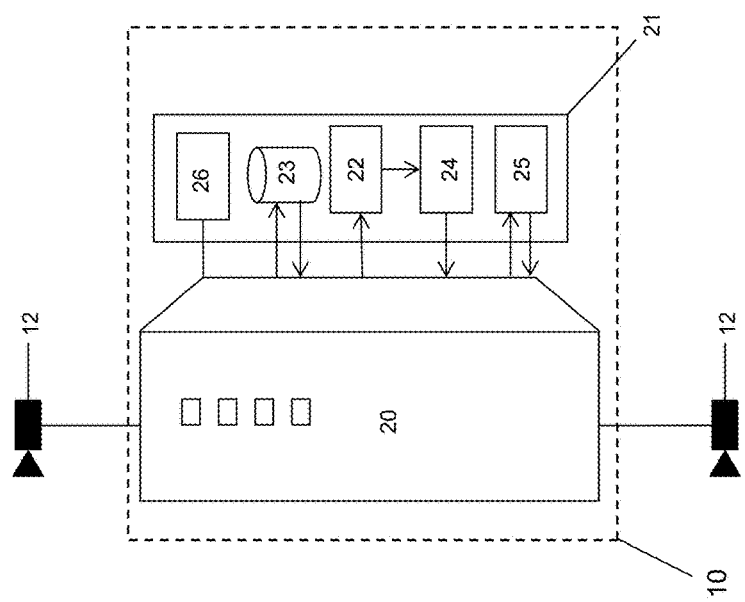
FIG. 2a is a schematic representation of a computer implemented surveillance system comprising a plurality of imaging nodes and a surveillance server that receives surveillance streams from the imaging nodes.

A schematic representation of a surveillance server 20 is depicted in FIG. 2a. The surveillance server 20 comprises several components that represent functional elements of a surveillance system 10. These components may be implemented in software or hardware (such as an ASIC, FPGA or microcontroller).

The fundamental functionality of the illustrated components can be accomplished with various software and/or hardware arrangements. For instance, the entire system may be integrated in a single centralized server or distributed across several interconnected computing systems (including virtual machines).

The functional components illustrated in FIG. 2a may be implemented in any suitable computing architecture, such as cloud based systems, virtual machine(s) operating on shared hardware, dedicated hardware machine(s) or a server bank of connected hardware and/or virtual machines. The term 'server' in this specification represents general computing system functionality and is not limited to a particular type of architecture.

The surveillance system 10 illustrated in FIG. 2a determines an elapsed time between distinct checkpoints for individual pedestrians passing along the route depicted in FIG. 1. The average elapsed time between checkpoints can be used to assess delays and assign operational resources (such as allocating additional customs officers if arrival processing times are unacceptable). The surveillance server 20 may also identify suspicious activity based on excessive delay times.

The surveillance server 20 is integrated in a surveillance system 10 that includes the imaging nodes 12 depicted in FIG. 1. Each of the illustrated imaging nodes 12 relays an image stream to the surveillance server 20. The surveillance streams are transmitted to the surveillance server 10 via a data network, such as a wired or wireless local area network.

Figure 4:
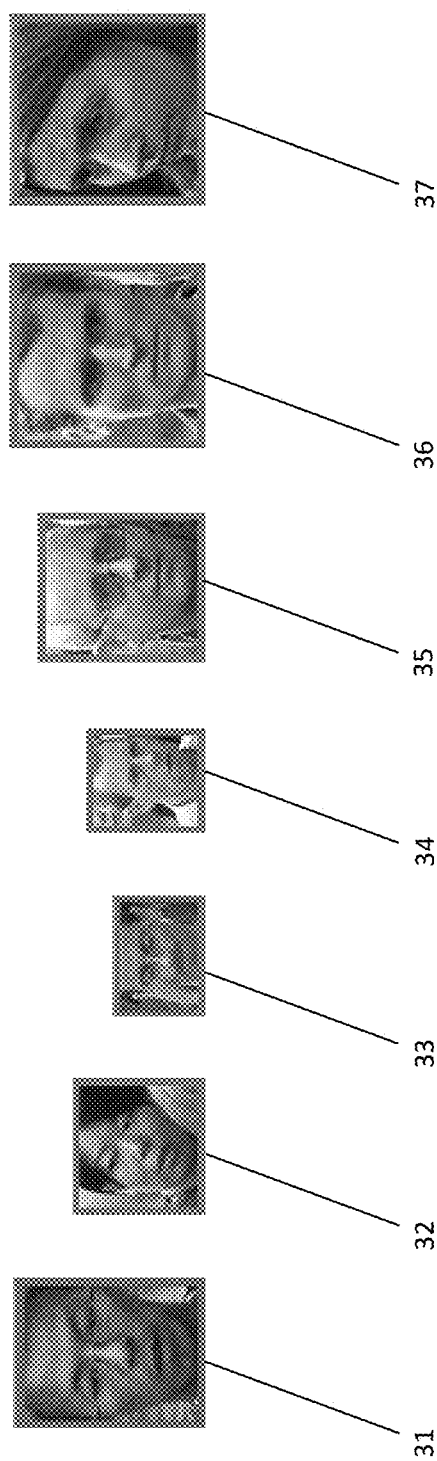
FIG. 4 is a sub-frame section extracted from the image frame depicted in FIG. 3.

The imaging nodes 12 depicted in FIG. 2a capture shape, space and color information in the corresponding image streams. This information is transmitted to the surveillance server 20 and transformed into image data for use in matching. The surveillance server 20 illustrated in FIG. 2a identifies salient content (such as pedestrian facial characteristics) within individual frames of the surveillance stream and generates image data from the salient content. Typical image data includes:

quantitative facial profiles, isolated sub-frame sections of the surveillance stream (such as the facial sections illustrated in FIG. 4), and complementary pedestrian profiles (such as the color, shape, size and proportion of a pedestrian's torso).

The surveillance server 20 illustrated in FIG. 2a incorporates an image processing module 21 that matches pedestrian image data derived from distinct surveillance streams to track pedestrians along the route 13. The image processing module 21 is a software engine that is executed by the surveillance server 20 using computing hardware. The surveillance server 20 uses the elapsed time between image frames following identification of a positive facial match by the image processing module 21 to determine the 'dwell time' for a corresponding pedestrian. 'Dwell time' is a quantitative measure of pedestrian progression between checkpoints. The time between two distinct checkpoints is determined from the temporal reference associated with the respective image frames.

The surveillance server 20 processes the image streams received from the imaging nodes 12 to detect and record image content that is indicative of pedestrians. A tracking engine 22 extracts facial image data from sub-frame sections of the image frames that correspond to detected pedestrians. The facial image data extracted by the tracking engine 22 may comprise image content (such as isolated sub-frame sections of the image frames), independent image data derived from the sub-frame image content (such as quantitative facial profiles) or a combination of image content and quantitative data. The tracking engine 22 is also capable of extracting complementary pedestrian image data, such as the color and shape of a pedestrian's torso.

The tracking engine 22 may also extract non-facial characteristics of pedestrians captured within the image frames (such as the relative height, clothing color and general body shape of detected pedestrians). The processing module 21 is capable of using non-facial pedestrian characteristics to supplement facial matching (increasing the available characteristics used to match pedestrians) and/or verify facial matches. The surveillance server 20 combines general pedestrian image data (both facial and non-facial pedestrian characteristics) in consolidated pedestrian profiles.

The illustrated server 20 is capable of identifying individual pedestrians within a moving crowd. This process is depicted schematically in FIG. 3. The image processing module 21 detects facial image content captured in image frames from each of the surveillance streams and generates a content map for the detected content. The content map defines an in-frame reference for pedestrian facial content. The image processing module 21 is capable of detecting multiple pedestrians within a single image frame (as depicted in FIG. 3) and producing a consolidated content map.

Figure 3:
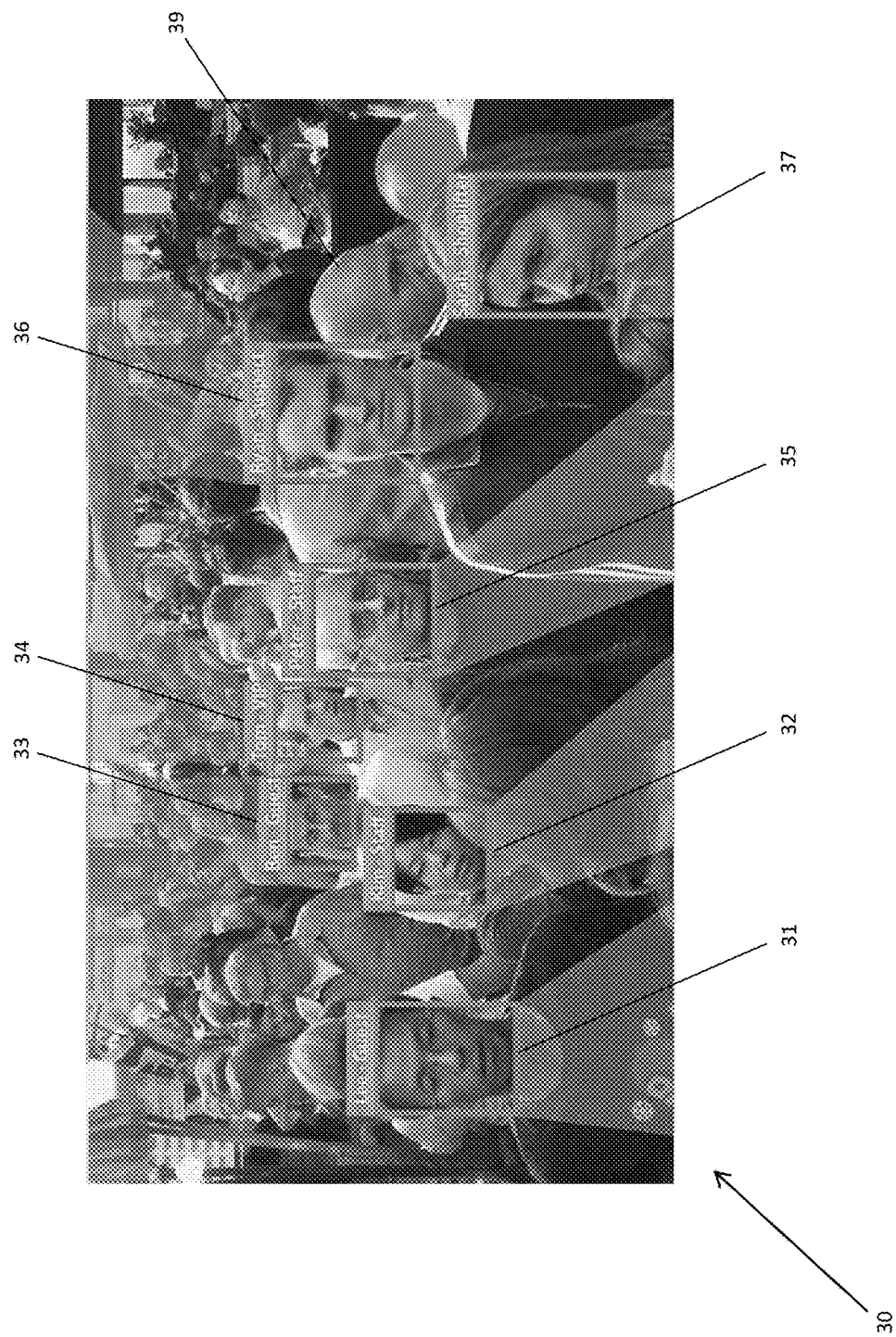
FIG. 3 is a schematic representation of an image frame from a surveillance stream produced by one of the imaging nodes depicted in FIG. 1.

The processed image frame depicted in FIG. 3 comprises a plurality of sub-frame sections (enumerated 31 to 37) that bound facial content detected by the image processing module 21. The content map for this image frame defines coordinates (such as Cartesian coordinates that coincide with the image frame boundary) for each of the depicted sub-frame sections 31 to 37. The tracking engine 22 uses the content map to extract facial image data for detected pedestrians. The tracking engine 22 is capable of isolating image data for multiple pedestrians within a single image frame. Isolated image content extracted from each of the sub-frame sections identified in FIG. 3 is presented in FIG. 4.

The surveillance server 20 evaluates the image content captured within each of the sub-frame sections before extracting data from an image frame. The illustrated surveillance server 20 incorporates a compliance engine 26 that generates compatibility scores for each sub-frame section containing facial image content. The compatibility scores are a quantitative measure of image content that represents facial profiling confidence. Typical image characteristics that influence the compatibility score include image perspective (evident in the relative size of isolated image content depicted in FIG. 4), facial obstructions (such as the partial facial obstruction of pedestrian 39 in FIG. 3) and lighting consistency.

An individual pedestrian may be captured in several consecutive image frames received from a checkpoint (especially when the imaging nodes 12 use a high sampling rate). The surveillance server 20 is capable of comparatively evaluating the sampling quality of each 'duplicate' sub-frame image section using the associated compatibility scores produced by the compliance engine 26. The comparative analysis allows the surveillance server 20 to discard 'duplicate' facial profiles generated from substandard image content. The surveillance server 20 may compile a consolidated facial profile from several 'duplicate' profiles to improve the profiling confidence for a corresponding pedestrian.

The surveillance server extracts pedestrian image data from each of the image streams received via the illustrated surveillance network. A matching engine 25 uses extracted facial image data to track pedestrian progress along the route. Other pedestrian characteristics (such as shirt color, relative height and body shape) may be used to supplement facial matching. The matching engine 25 compares image data extracted from distinct checkpoints along the route and determines the time taken (the 'elapsed time') between checkpoints when a match is determined The surveillance server 20 stores pedestrian image data extracted from the surveillance streams in non-volatile system memory. The surveillance system 10 illustrated in FIG. 2a incorporates a recording module 23 that manages image data storage. The recording module 23 allocates time data (such as a time stamp) to extracted image data to facilitate elapsed time calculations. The time data define temporal references for corresponding image frames (the source of the extracted image data). The matching engine 25 determines the time between image frames using the respective time data when a facial match is determined. Pedestrian image data is typically discarded after a set time.

The surveillance server 20 illustrated in FIG. 2a collates image data from positive pedestrian matches in temporary storage sets. Each image data set contains a pedestrian profile (such as facial image data) and temporal references for the pedestrian at corresponding surveillance checkpoints. The image data sets facilitate temporal pedestrian tracking along defined routes. They also enable 'dwell time' determination for individual checkpoints (such as wait time estimation for queues). The server may store image data in a structured or relational database.

The recording module 23 is capable of extracting sub-frame image content from the surveillance streams for independent storage. Isolated sub-frame sections from the image frame depicted in FIG. 3 are reproduced in FIG. 4. The isolated sub-frame sections are typically stored in non-volatile system memory for a prescribed time period with the corresponding time data.

The surveillance server 20 is also capable of quantifying the facial characteristics of pedestrians captured in the surveillance streams for storage in independent facial profiles. The illustrated surveillance system 10 includes a profiling engine 24 that extracts quantitative image data from the sub-frame sections defined by the image processing module 21. The quantitative image data is typically stored in facial profiles that identify distinctive facial characteristics of the pedestrians. The profiling engine 24 is capable of compiling facial profiles for multiple pedestrians captured within a single image frame. The facial profiles are stored in system memory with time data derived from a corresponding image frame.

The quantitative image data may define physical facial characteristic of detected pedestrians, such as the relative proportions of predefined landmark facial features. For example, the profiling engine 24 is capable of generating facial profiles from the relative position, size and/or shape of a predefined subset of facial features (such as a detected pedestrians eyes, nose, cheekbones and/or jaw). The surveillance server 20 may also produce quantitative image data from normalized facial image content. The profiling engine 24 is capable of normalizing facial image content against a repository of facial images and extract distinctive image characteristics that differentiate individual pedestrians. This allows the surveillance server 20 to discard indistinguishable image data to reduce storage and processing overheads.

The illustrated matching engine 25 compares the facial profiles derived from surveillance streams captured at distinct checkpoints along the route to track pedestrian progress. The image processing module 21 calculates dwell times for individual pedestrians from the elapsed time between the corresponding time data when a match is determined. This allows the surveillance server 20 to quantify pedestrian progress and determine delays along the route.

A distributed implementation of the surveillance system 10 illustrated in FIG. 2a is depicted in FIG. 2b. The respective surveillance systems 10, 11 perform the same fundamental operation with the same functional components (identified with the similar reference numerals in the drawings). The hardware architecture of the distributed system 11 facilitates image processing at source. This reduces network usage and server 20 overheads.

The distributed surveillance system 11 incorporates 'smart' imaging nodes 14 with integrated processing capabilities. This allows the function of the image processing module 21 (depicted in FIG. 2a) to be divided between the server 20 and imaging nodes 14. The imaging nodes 14 illustrated in FIG. 2b have dedicated tracking 22 and profiling 24 engines.

The 'smart' imaging nodes 14 generate image data from the localized surveillance stream captured at the respective checkpoint. The image data is transmitted to the server 20 via a data network for matching and storage. This reduces bandwidth usage (as the surveillance stream is not processed before transmission).

The imaging nodes 'push' image data to the server 20 via a data network. Each of the illustrated imaging nodes 14 has a localized memory module to facilitate short term storage. The localized memory module is commonly used to cache image data before transmission to the server 20, retain image data during network faults and store the surveillance stream (usually in a circular buffer).

Figure 5:
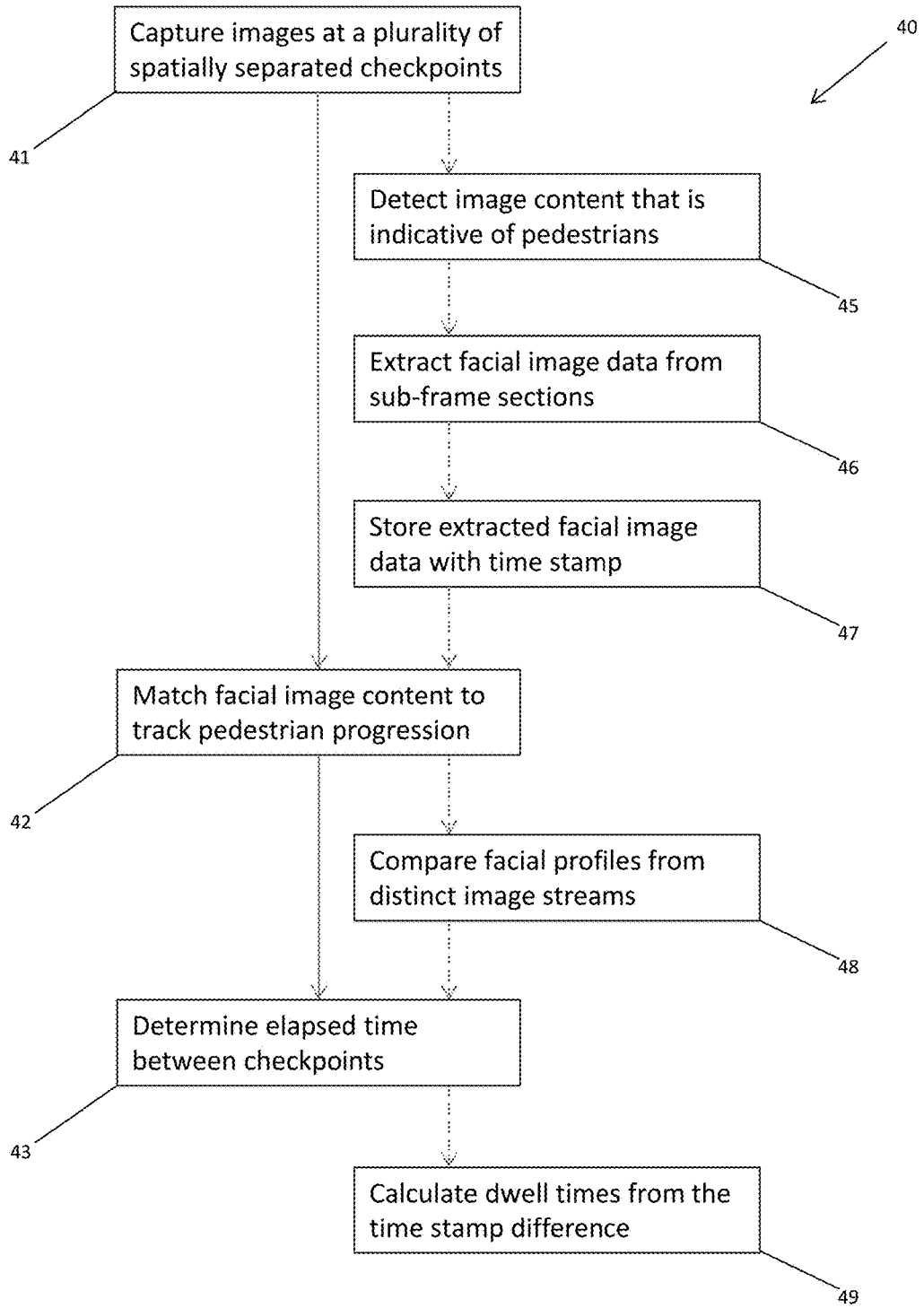
FIG. 5 is a flow diagram of a pedestrian tracking process.

A general outline of the pedestrian tracking process implemented by the surveillance systems 10, 11 is illustrated graphically in FIG. 5. The primary operations depicted in FIG. 5 include:

capturing images of a pedestrian at a plurality of checkpoints that are spatially separated along a route (operation 41), matching facial image content captured at distinct checkpoints along the route to track progression of the pedestrian (operation 42), and determining an elapsed time for the pedestrian between the distinct checkpoints using a temporal reference derived from corresponding images of the pedestrian (operation 43).

The flow diagram 40 depicted in FIG. 5 also incorporate a plurality of supplementary operations 45 to 49 that are executed between the primary operations 41 to 43. The supplementary operations depicted in FIG. 5 include:

detecting image content that is indicative of pedestrians within individual image frames of the surveillance streams (operation 45), extracting facial image data from sub-frame sections that contain facial image content for individual pedestrians (operation 46), storing the extracted facial image data in system memory with time data that defines a temporal reference for the corresponding image fame (operation 47), matching facial image data derived from surveillance streams captured at distinct checkpoints along the route (operation 48), and determining an elapsed time between the distinct checkpoints for individual pedestrians from the time data stored with each set of matching facial image data (operation 49).

Exemplary Installations

The surveillance system 10, 11 may be used to monitor crowds in enclosed spaces (such as airports, train stations, shopping malls and school buildings). An exemplary installation is depicted in FIG. 1.

Pedestrians enter the depicted route 13 via a single entryway 50. The depicted entryway 50 represents a restricted access passageway, such as an airport departure gate or the ticketing gate of a stadium. An imaging node 12 is disposed adjacent an entry checkpoint 51. The imagining node 12 transmits an image stream to the surveillance system 10, 11 from the entry checkpoint 51. The surveillance system uses this surveillance stream to detect pedestrians entering the route 13 and identify delays at the entry checkpoint 51 (such as the entry queues). The profiling engine 24 extracts pedestrian images data (including facial image data) from the image stream and allocates a time stamp to the extracted data.

The depicted entryway 50 leads to an open plan space 56. The open plan space 56 may be used to store items (such as a warehouse or stock room), contain services (such as vendors, advertising and lockers) or host audiences (such as an auditorium or cinema). Imaging nodes (not depicted in FIG. 1) may be positioned within the open plan space 56 to monitor pedestrian behavior. Typically monitoring applications include vendor dwell time estimation, advertising exposure and loss prevention.

The depicted route 13 has four defined exit checkpoints 52, 53, 54, 55. Imaging nodes 12 are disposed adjacent each of the exit checkpoints 52, 53, 54, 55. The surveillance system 10, 11 uses the surveillance streams from each of the exit checkpoints to detect pedestrians exiting the route 13. The profiling engine 24 matches 'exit profiles' (pedestrian profiles captured at the exit checkpoints 52, 53, 54, 55) with 'entry profiles' (pedestrian profiles captured at the entry checkpoint 51) to determine 'route times' for corresponding pedestrians. The surveillance system 10, 11 derives the route times from the time stamps allocated to matching entry and exit profiles.

There are several imaging nodes 12 disposed at intermediate positions along the walkways depicted in FIG. 1. These imaging nodes facilitate decomposition of the route times. For example, the surveillance system 10, 11 may use the intermediate imaging nodes to estimate pedestrian queue times in the walkways. This can be achieved by eliminating the 'dwell time' attributable to the open plan space 56 from the 'route time' calculated for the pedestrian or determining the elapsed time between intermediate and exit checkpoints.

The surveillance system 10, 11 determines average dwell times for each segment of the route 13 from the individual dwell times calculated for groups of pedestrian. The average dwell times can be used to evaluate processing times, determine advertising rates and improve resource allocation. The surveillance system 10, 11 may process pedestrian data to eliminate outliers that distort average dwell time calculations.

This processing can include:
removing staff from dwell time calculations (using facial enrolment, uniform detection or similar processes),
regulating individual pedestrian segment times to account for backtracking along the route, and
removing duplicate image data.

Quantifying Facial Images

Face matching methods can be classified into two general categories: holistic and local-feature based. In typical holistic methods, a single feature vector describes the entire face and the spatial relations between face characteristics (e.g. eyes) are rigidly kept. Examples of holistic facial matching methods include PCA and Fisherfaces. In contrast, local-feature based methods describe each face as a set of feature vectors (with each vector describing a small part of the face), with relaxed constraints on the spatial relations between face parts. Examples include systems based on elastic graph matching, hidden Markov models (HMMs) and Gaussian mixture models (GMMs).

Local-feature based methods have the advantage of being considerably more robust against misalignment as well as variations in illumination and pose. As such, face recognition systems using local-feature based approaches are often more suitable for dealing with faces obtained in surveillance contexts.

The MRH-based face matching method is now briefly described. The MRH local-feature face matching method can be thought of as a hybrid between the HMM and GMM based systems. The MRH approach is motivated by the 'visual words' technique originally used in image categorisation.

Each face is divided into several fixed and adjacent regions, with each region comprising a relatively large part of the face. For region a set of feature vectors is obtained, $F_r = \{f_{r,i}\}_{i=1}^{N}$, which are in turn attained by dividing the region into small overlapping blocks (or patches) and extracting descriptive features from each block via two Dimensional (2D) Discrete Cosine Transform (DCT) decomposition.

Each block has a size of 8×8 pixels, which is the typical size used for DCT analysis. To account for varying contrast, each block is normalised to have zero mean and unit variance. Coefficients from the top-left 4×4 sub-matrix of the 8×8 DCT coefficient matrix are used, excluding the 0-th coefficient (which has no information due to the normalisation).

For each vector $f_{r,i}$ obtained from region r, a probabilistic histogram is computed:

$$h_{r,i} = \left[ \frac{w_1 p_1(f_{r,i})}{\sum_{g=1}^{G} w_g p_g(f_{r,i})}, \ldots, \frac{w_G p_G(f_{r,i})}{\sum_{g=1}^{G} w_g p_g(f_{r,i})} \right]^T \quad (1)$$

where the g-th element in $h_{r,i}$ is the posterior probability of $f_{r,i}$ according to the component of a visual dictionary model. The mean of each Gaussian can be thought of as a particular 'visual word'.

Once the histograms are computed for each feature vector from region r, an average histogram for the region is built:

$$h_{r,avg} = \frac{1}{N} \sum_{i=1}^{N} h_{r,i} \quad (2)$$

The overlapping during feature extraction, as well as the loss of spatial relations within each region (due to averaging), results in robustness to translations of the face which are caused by imperfect face localisation. The DCT decomposition acts like a low-pass filter, with the information retained from each block being robust to small alterations (e.g. due to minor in-plane rotations).

The normalised distance between faces X and Y is calculated using:

$$d_{norm}(X, Y) = \frac{d_{raw}(X, Y)}{\frac{1}{2M} \sum_{i=1}^{M} \{d_{raw}(X, C_i) + d_{raw}(Y, C_i)\}} \quad (3)$$

where $C_i$ is the i-th cohort face and M is the number of cohorts, while $d_{raw}(\bullet,\bullet)$ is a $L_1$-norm based distance measure between histograms from R regions:

$$d_{raw}(X, Y) = \frac{1}{R} \sum_{r=1}^{R} \|h_{r,avg}^{[X]} - h_{r,avg}^{[Y]}\|_1 \quad (4)$$

The denominator in Eqn. (3) estimates how far away, on average, faces X and Y are from a randomly selected face. This typically results in Eqn. (3) being approximately 1 when X and Y represent faces from two different people, and less than 1 when X and Y represent two instances of the same person.

In the above embodiments, a dwell time for people travelling along a route is determined. The invention is not limited to determination of dwell time, however. In some embodiments, the route a person takes may be determined without any dwell time determination.

Embodiments of the present invention may be implemented using software (including firmware) and/or dedicated hardware (including integrated circuits and programmable logic devices). Software embodiments can be platform independent (leveraging a virtual machines to interface with underlying hardware), compiled for execution by a target operating systems (such as Windows, OSX, Android, iOS) or developed for customised hardware platforms with defined instruction sets (such as 'system on chip' hardware). Hardware systems can incorporate dedicated circuitry (including 'application specific integrated circuits' or ASIC) and/or programmable logic device (such as 'field programmable gate arrays').

Software instructions for performing embodiments of the invention may be stored in a non-transitory computer readable medium (such as a magnetic hard drive or solid state drive), data signals (typically transmitted via a communication network) or read only memory (such as PROM, EPROM and EEPROM).

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

The invention claimed is:

1. A surveillance process comprising, by a computer system:
   receiving surveillance streams from a plurality of checkpoints that are spatially separated along a route, each of the surveillance streams comprising a sequence of image frames,
   automatically detecting image content in sub-frame sections of the surveillance streams and generating profiles from sub-frame sections that contain facial content for individual people,
   storing the profiles in system memory with time data, derived from a corresponding image frame, that define a plurality of temporal references at each checkpoint location,
   matching profiles derived from surveillance streams captured at distinct checkpoints along the route to determine the elapsed time at checkpoint locations, and
   determining a dwell time for individuals, based on determining the elapsed times between the checkpoint locations for individual people from the time data and checkpoint location data stored with each set of matching profiles, whereby the determined dwell time may be utilized to inform one of operational and security processes associated with a location being surveyed by the surveillance process.

2. The process of claim 1 comprising, by the computing system, isolating sub-frame sections that contain facial characteristics of detected people and storing the isolated sub-frame sections in system memory.

3. The process of claim 1 comprising, by the computing system, quantifying facial characteristics of people detected in the surveillance streams and compiling profiles from the quantified facial characteristic data.

4. The process of claim 3 comprising, by the computing system, identifying a predefined subset of facial features for people and generating profiles comprising quantified facial data derived from the predefined subset of facial features.

5. The process of claim 3 comprising, by the computing system, generating the profiles from the relative position, size and/or shape of a detected person's eyes, nose, cheekbones and/or jaw.

6. The process of claim 3 comprising matching profiles derived from surveillance streams captured at distinct checkpoints to track a person's progress along the route.

7. The process of claim 1 comprising, by the computing system, normalizing sub-frame sections containing facial image content using a repository of facial images and identifying distinctive image characteristics from the sub-frame sections.

8. The process of claim 7 comprising, by the computing system, recording the distinctive image characteristics in profiles and matching the profiles derived from surveillance streams captured at distinct checkpoints to track a person's progress along the route.

9. The process of claim 1 comprising, by the computing system, detecting a plurality of individual people within a single frame of a surveillance stream and generating profiles for detected people from corresponding sub-frame sections of the image frame.

10. The process of claim 1 comprising, by the computing system, identifying facial image content for an individual person captured in a plurality of consecutive image frames from a single surveillance stream and comparatively evaluating the facial image content captured in each of the consecutive frames.

11. The process of claim 10 comprising, by the computing system, compiling a profile from image data selectively extracted from one of the consecutive image frames.

12. The process of claim 10 comprising, by the computing system, compiling a consolidated profile from image data extracted from a plurality of the consecutive image frames.

13. A surveillance process comprising:
    receiving images of a person from a plurality of checkpoints at checkpoint positions that are spatially separated along a route,
    matching facial image data derived from images captured at distinct checkpoints along the route to track progression of the person and the time spent at each checkpoint position, and
    determining an elapsed time for the person between the distinct checkpoint positions using a temporal reference derived from corresponding images of the person, at the checkpoint positions, and
    determining a dwell time for the person, based on the elapsed time, whereby the determined dwell time may be utilized to inform one of operational and security processes associated with a location being surveyed by the surveillance process.

14. The process of claim 13 comprising detecting image content within sub-frame sections of a surveillance stream and generating profiles from sub-frame sections that contain facial content for individual people.

15. The process of claim 14 comprising quantifying facial characteristics of people detected in the surveillance streams and compiling profiles from the quantified facial characteristic data.

16. The process of claim 15 comprising identifying a predefined subset of facial features for a detected person and generating a profile comprising quantified facial data derived from the predefined subset of facial features.

17. A surveillance system comprising a computing system that is configured to receive surveillance streams from a plurality of imaging nodes disposed at spatially separated checkpoint positions along a route and track the progress of people along the route using elapsed time between distinct checkpoints, the computing system having an image processing module that is configured to generate profiles for individual people captured within frames of the surveillance streams and match profiles derived from distinct surveillance streams to determine an elapsed time at checkpoints for a corresponding person, and to determine a dwell time for the corresponding person based on the elapsed times and the check point locations, whereby the determined dwell time may be utilized to inform one of operational and security processes associated with the location being surveyed by the surveillance system.

18. The system of claim 17 comprising a recording module that is configured to isolate sub-frame sections captured within the surveillance streams that contain facial characteristics of detected people, and store the isolated sub-frame sections in system memory with time data that defines a temporal reference for the corresponding image fame.

19. The system of claim 17 comprising a profiling engine that is configured to quantify facial characteristics of people captured within the surveillance streams and compile profiles from quantified facial characteristic data for each of the people.

20. The system of claim 18 comprising a profiling engine that is configured to identify a predefined subset of facial features captured in the isolated sub-frame sections and generate profiles comprising quantified facial data derived from the predefined subset of facial features.

21. The system of claim 19 wherein the profiling engine is configured to generate profiles from the relative position, size and/or shape of a detected person's eyes, nose, cheekbones and/or jaw.

22. The system of claim 19 comprising a matching engine that is configured to compare profiles derived from surveillance streams captured at distinct checkpoints to track progress of people along the route.

23. The system of claim 18 comprising a profiling engine that is configured to normalize the isolated sub-frame sections using a repository of facial images, and identify distinctive image characteristics from the sub-frame sections.

24. The system of claim 23 comprising a matching engine that is configured to record the distinctive image characteristics in profiles, and match profiles derived from surveillance streams captured at distinct checkpoints to track progress of people along the route.

25. The system of claim 17 comprising a tracking engine that is configured to detect a plurality of individual people within a single frame of a surveillance stream, and generate profiles for detected people.

26. The system of claim 17 comprising a compliance engine that is configured to identify facial image content for an individual person captured in a plurality of consecutive image frames from a single surveillance stream at a checkpoint position, and comparatively evaluate the facial image content captured in each of the consecutive frames.

27. The system of claim 26 comprising a profiling engine that is configured to compile a profile from image data selectively extracted from one of the consecutive image frames.

28. The system of claim 26 comprising a profiling engine that is configured to compile a consolidated profile from image data extracted from a plurality of the consecutive image frames.

29. A surveillance system comprising:
a network of imaging nodes disposed along a route at spatially separated checkpoint positions, each of the imaging nodes having a camera that is configured to capture a localized surveillance stream comprising a sequence of image frames and a processing unit that is configured to generate profiles from the corresponding surveillance stream, the checkpoint positions and a plurality of temporal references associated with the image frames, and a computing system that is configured to receive profiles from the imaging nodes and track the progress of individual people along the route using elapsed time between distinct checkpoint positions, the computing system having a processor that is configured to match profiles derived from distinct checkpoint positions and determines the elapsed time from the corresponding surveillance streams, the checkpoint positions and the temporal references associated with the image frames provided by the surveillance streams, and to determine dwell times or individuals, based on the elapsed times at the checkpoint locations, whereby the determined dwell times may be utilized to inform one of operational and security processes associated with a location being surveyed by the surveillance process.

30. A non-transitory computer readable medium with stored instructions that, when executed by a computing system, cause the computing system to perform a process comprising:

receiving images of a person from a plurality of checkpoint positions that are spatially separated along a route, matching facial image data derived from images captured at distinct checkpoint positions along the route and temporal data associated with the image data to track progression of the person, and determining an elapsed time for the person between the distinct checkpoints using the temporal reference derived from corresponding images of the person, the checkpoint position data, and determining a dwell time for the person based on the elapsed time at the checkpoint locations, whereby the determined dwell time may be utilized to inform one of operational and security processes associated with a location being surveyed.

31. The process of claim 1 comprising, by the computing system, determining dwell times for a plurality of individuals and determining an average dwell time based on the plurality of determined dwell times.

32. The system of claim 17, wherein the image processing module is arranged to determine dwell times for a plurality of people and to determine an average dwell time based on the dwell times for the plurality of people.

* * * * *